W. T. Carroll.

Spinning Ring.

No. 3,714. Reissued Nov. 9, 1869.

Witnesses
S. N. Piper
J. R. Snow

Inventors
Geo. Draper & Son
by their attorney
N. W. Eddy

N. PETERS, PHOTO-LITHOGRAPHER, WASHINGTON, D. C.

UNITED STATES PATENT OFFICE.

GEORGE DRAPER AND WILLIAM F. DRAPER, OF HOPEDALE, MASSACHUSETTS, ASSIGNEES OF WILLIAM T. CARROLL.

IMPROVEMENT IN RINGS FOR SPINNING-MACHINES.

Specification forming part of Letters Patent No. 78,427, dated June 2, 1868; Reissue No. 3,714, dated November 9, 1869.

*To all persons to whom these presents may come:*

Whereas Letters Patent No. 78,427, dated June 2, 1868, were granted to WILLIAM T. CARROLL on a new and useful invention having reference to Ring and Traveler Spinning-Machines, and have since been assigned and conveyed to the undersigned, GEORGE DRAPER & SON—that is, to GEORGE and WILLIAM F. DRAPER—of Hopedale, of the State of Massachusetts, and are believed by the undersigned to be not sufficient to cover the invention of the said CARROLL, and they, the undersigned, have petitioned for a reissue of the patent: now, therefore, they do hereby declare the said invention to be fully described in the following specification and represented in the accompanying drawings, of which—

Figure 1:
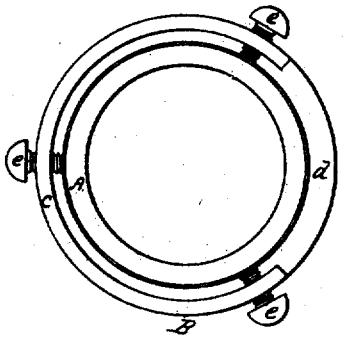
Figure 3:
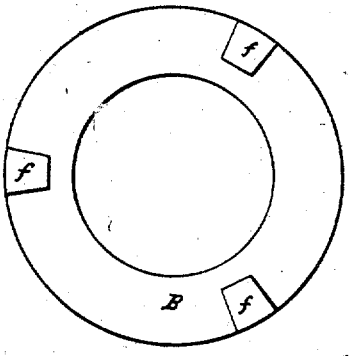
Figure 2:
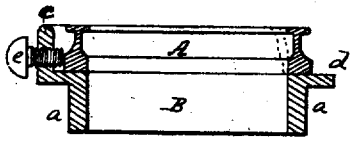

Figure 1 is a top view, and Fig. 2 a transverse section, of a ring and one construction of its supporters as made in accordance with the invention. Fig. 3 is a top view, and Fig. 4 a transverse section, of a ring-supporter having a form somewhat different from that shown in Figs. 1 and 2, and still being in accordance with the invention.

One purpose of the invention is to support the ring and enable it to be adjusted or centralized with reference to the spindle should the latter be or get out of its normal position.

Another purpose of such invention is to make the ring separate from the part which supports it on the ring-rail.

Another purpose was to effect a new or improved arrangement of the ring and its holder, such being so that the ring shall extend entirely above the ring-rail and into a rest in the holder, and the holder, separate from the ring, be within a socket in the rail, and extended above the rail.

Another object is to cleanse the traveler of fibrous collections.

Before the date of the invention a ring has been formed with an eccentric neck to enter an eccentric annulus, receiver, or supporter arranged in a socket or hole made in the ring-rail, the same being so as to enable the ring to be centralized with reference to the spindle should the latter get out of its normal position. This ring-receiver was made with a shank to fit the rail-socket, and had a bore eccentric with the cylindrical outer surface of such shank. With this receiver, which was of the same material with the ring, the said ring extended into the receiver and the ring-rail socket. With the present arrangement of the parts no part of the ring proper goes into the ring-rail, the ring carrier or holder being the only portion or piece which extends into the rail, or both into and above it.

The ring, as represented, is made without the usual neck to enter the rail, but simply so as to rest or be supported on or in and extend above the supporter; and there is projected upward from the latter a flange to go around the ring, and receive three screws screwed radially through it, and against the outer periphery of the ring, such screws being arranged at, or about at, equal distances apart. Instead of such flange, there may be three short posts extended up from the supporter, the adjusting-screws being screwed through such posts. The flange, however, is preferable, and especially when it is not carried entirely around the ring—that is, so that there may be an open space between the two extremities of the flange, the same being as shown at *d* in Fig. 1 of the accompanying drawings, as this enables access to the traveler to be had to better advantage, as occasion may require. It also facilitates the removal of the ring, and is beneficial in other respects.

Before the date of the present invention a ring made with a neck to extend into the ring-rail has had adjusting-screws screwed into the rail and against the said neck, the ring being supported on the rail by a shoulder at the junction of the ring and its neck. This latter mode of arranging the adjusting-screws is very inconvenient for ready access to be had to them at the back of the rail.

In the drawings, A denotes the ring, and B the holder or supporter thereof, the latter being provided with an annular neck to enter a corresponding socket of the ring-rail.

The flange, raised on the supporter and extending partially around it, is shown at *c*, there being an open space, *d*, between the two ends of the said flange.

The adjusting-screws *eeee* are screwed through the flange, and against the lower part of the periphery of the annulus A.

Figure 4:
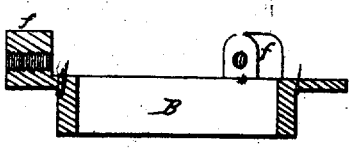

In Figs. 3 and 4 the supporter of the ring A is shown provided with three posts, *f f f*, for the reception of the adjusting-screws, which are to be screwed through such posts.

The improvement, as represented, besides effecting advantages as to the adjustment of the ring, also secures that of cleansing the traveler of any fibrous matters which may collect thereon, for when, during the movement of the traveler around the race of the ring, any such matter or matters may be carried by the traveler into contact with an end of the flange, or against either of the adjusting-screws or either of the posts, the part so struck will serve to detach or loosen such fibrous matter or matters from the traveler.

The improved construction of the ring enables it to be made at much less expense, in comparison, to what it can be constructed for when provided with a neck to enter the ring-rail, and with a shoulder to go around such neck and rest on the rail.

What is claimed by the undersigned as the invention of the said CARROLL may be thus explained, viz:

1. The combination of the flange *c*, or the posts *f*, and the adjusting-screws *e*, with the annulus A and the supporter B thereof, to be placed on and within the ring-rail, as specified.

2. Also, the new or improved arrangement of a ring and its holder, the same being so that the former shall extend entirely above the ring-rail, and in or on the holder, and the latter, separate from the former, be extended above the rail and within a socket made therein.

3. Also, the flange *c*, when provided with the open space *d*, and the screws *e e e*, and combined with or forming part of the supporter B, and for use with the ring A, as set forth.

GEORGE DRAPER.
WM. F. DRAPER.

Witnesses:
R. H. EDDY,
S. N. PIPER.